United States Patent [19]

Evans et al.

[11] Patent Number: 5,301,615
[45] Date of Patent: Apr. 12, 1994

[54] RAILCAR MOVING VEHICLE HAVING MONITORED WEIGHT TRANSFER PROCESS INCLUDING SENSORS FOR SENSING TRANSFER OF FULL WEIGHT

[75] Inventors: Robert E. Evans, LaGrange; Richard L. Lich, Newnan, both of Ga.

[73] Assignee: Trackmobile, Inc., LaGrange, Ga.

[21] Appl. No.: 49,822

[22] Filed: Apr. 19, 1993

[51] Int. Cl.5 .............................................. B61C 15/04
[52] U.S. Cl. .................... 105/75; 280/407.1; 213/75 R; 105/73; 254/33
[58] Field of Search ............. 105/73, 75, 72.2; 213/75 R; 280/407, 407.1; 254/1, 33, 34

[56] References Cited

U.S. PATENT DOCUMENTS

| | | | |
|---|---|---|---|
| 2,722,897 | 10/1952 | Morey | 105/73 |
| 3,709,153 | 1/1973 | Herscovitch | 105/75 X |
| 3,884,156 | 5/1975 | Ames et al. | 105/75 |
| 3,892,187 | 7/1975 | White, Jr. | 105/75 |
| 4,380,198 | 4/1983 | White, Jr. | 105/73 X |
| 4,497,257 | 2/1985 | White, Jr. | 105/72.2 |
| 4,537,137 | 8/1985 | White, Jr. | 105/72.2 |
| 4,878,436 | 11/1989 | Lich et al. | 105/72.2 |

Primary Examiner—Robert J. Oberleitner
Assistant Examiner—S. Joseph Morano
Attorney, Agent, or Firm—Allegretti & Witcoff, Ltd.

[57] ABSTRACT

A railcar moving vehicle having a hydraulic system for raising the vehicle coupler while coupled to a railroad car or the like to transfer weight from the railcar to the vehicle. By this invention, fluid pressure in the hydraulic power line is sensed, to monitor an increase in the fluid pressure as the hydraulic system raises the vehicle coupler while coupled to a railcar. Then, when a substantial termination of the increase in fluid pressure is sensed as the hydraulic coupler is raised, an indicator signals the occurrence of this event, typically by automatically terminating the hydraulic raising of the vehicle coupler. Thus, weight may be transferred without overraising the railcar, without the need for estimating the weight of the railcar prior to the weight transfer process.

6 Claims, 2 Drawing Sheets

RAILCAR MOVING VEHICLE HAVING MONITORED WEIGHT TRANSFER PROCESS INCLUDING SENSORS FOR SENSING TRANSFER OF FULL WEIGHT

BACKGROUND OF THE INVENTION

Railcar moving vehicles having a weight transfer capability have been sold the railroad industry for years, being of a design which is typified for example by White U.S. Pat. Nos. 4,497,257; 4,537,137; and 4,380,198; and Lich et al. U.S. Pat. No. 4,878,436, among others.

These railcar moving vehicles typically are too light to effectively pull a loaded railcar without significant wheel slippage. Therefore, a weight transfer mechanism is provided, in which the coupler of the railcar moving vehicle, which connects to the railcar, may be driven upwardly, typically by hydraulic cylinders. This upward force is of course transferred to the coupled railcar, which has the effect of "transferring" weight from the railcar to the railcar moving vehicle. Thus, the wheels of the railcar moving vehicle are provided with more traction, which permits the vehicle to effectively move heavily loaded railcars.

If the railcar is fully loaded, the operator of the moving vehicle can hook up to the car and typically position the coupler lift mechanism to the full-on position, thus transferring weight of typically up to 48,000 pounds onto the railcar moving vehicle. However, if the railcar is partially full or empty, then the operator must make a judgment of how much weight he can transfer to his vehicle. If his judgment is conservative, then he does not transfer the maximum possible amount of weight, which reduces the maximum tractive effort available for the vehicle. However, if the operator overestimates the amount of weight transfer, a more serious result can take place, in that the railcar can be lifted off of one of its railcar truck wheels. The railcar can be actually separated from one of its truck wheels so that, when the railcar moving vehicle moves the railcar, the truck wheel does not move with it. Potentially serious damage can take place in this instance.

In accordance with this invention, a simple apparatus and technique is provided for determining the point at which a maximum amount of load has been transferred from the railcar to the car moving vehicle, but the railcar has not yet been lifted off of its truck, so that the railcar can be effectively moved by the moving vehicle of this invention, even with an operator who is relatively unskilled. This substantially eliminates the accidental separation of the railcar from one of its truck wheels.

DESCRIPTION OF THE INVENTION

In this invention, a railcar moving vehicle has a frame, and is generally in accordance with prior art railcar vehicles except for the improvement of this invention. Specifically, the railcar moving vehicle has a coupler for connecting the vehicle to a coupler of a railcar, plus hydraulic means having a hydraulic power line for raising the vehicle coupler to transfer weight from the railcar to the vehicle.

In accordance with this invention, means are provided for sensing fluid pressure in the hydraulic power line, which is the line through which hydraulic fluid is pumped to the hydraulic cylinder or cylinders that provide the lifting of the vehicle coupler. The hydraulic means generally comprises a hydraulic pump, a hydraulic cylinder or cylinders, connecting fluid lines, and controls.

Comparator means are provided for monitoring an increase in the fluid pressure within the hydraulic power line as the hydraulic means raises the vehicle coupler while coupled to a railcar. This increase in the fluid pressure takes place as hydraulic fluid is pumped to the cylinder to raise the vehicle coupler, and results from the steady transfer of weight that is taking place from the railcar to the railcar moving vehicle as the couplers are raised.

The comparator means is also capable of sensing a substantial termination of the increase in fluid pressure as the hydraulic means further raises the vehicle coupler above the level where hydraulic pressure was increasing. This termination of pressure increase as the couplers raise takes place when the load of the railcar has been substantially fully transferred to the moving vehicle, so that, now, the railcar is being driven upwardly by the operating hydraulic cylinders with little or no increase in hydraulic pressure.

Indicator means are provided for signaling the occurrence of this substantial termination of the fluid pressure increase, which is the endpoint of the process, and indicates the time when the coupler lifting weight transfer process should cease, before the railcar is lifted off of its truck. The indicator means may so indicate this end point by automatically shutting off of the hydraulic means, so that the vehicle coupler ceases to rise. And for a predetermined time (milliseconds) the hydraulic valve is shifted to the lowering position to insure the railcar has a certain amount of preload on the truck springs.

Thus, by this invention, even an inexperienced operator can couple a railcar moving vehicle to a railcar, without knowing whether the car is partially full, completely full, or empty. The operator can simply press a button to activate the weight transfer process, and the device can automatically cycle by the use of electronic control circuitry which is readily understandable to those skilled in the art. The weight transfer device will raise the car to the point where maximum weight transfer has taken place irrespective of the weight of the car. At that point, where the pressure increase of fluid in the hydraulic power line substantially ceases with continued operation of the hydraulic raising means, the system automatically shuts off.

The means for monitoring the increase in fluid pressure and for sensing a substantial termination of such increase in fluid pressure may be a simple comparator circuit using an operational amplifier, a mechanical linear pressure transducer circuit, or commercially available electronic "rate-of-change" device that senses when the pressure rate levels off. The latter electronic device is sold by Beckman Instruments.

Alternatively, if the railcar is very heavy, the pressure in the hydraulic power line will rise until the maximum hydraulic system pressure is reached, or the hydraulic cylinder reaches its maximum stroke, and then goes to a system relief pressure mode. In either of these cases, the fluid pressure will cease to increase with continued operation of the hydraulic pump, resulting in a similar end point in the operation of this invention, which is preferably an automatic shut off of the hydraulic means.

Electrically, the system of this invention can be achieved by monitoring the pressure in the hydraulic lift cylinder circuit with a pressure transducer. The output signal is split and fed into a comparator amplifier. The resulting signal is split, and one leg is sent directly to the first input of the comparator amplifier, while the second leg is sent through a time delay, and then on to a second input of the comparator amplifier. The delay causes the two signals to be of different voltages under the circumstances where the pressure transducer is increasing its output signal due to rising pressure. When the pressure stabilizes, the delayed signal will match the direct input signal. This causes the output of the amplifier to signal the direction control valve in the hydraulic circuit to stop oil flow.

Mechanically, a similar hydraulic signal may be obtained from the force applied to the cylinder. A mechanical pressure indicator will be in motion as long as the signal pressure is increasing. When the signal pressure ceases to increase, indicating stabilization of the force, the indicator stops. A switch is mounted on the indicator and is opened and closed by moving against a rack as long as the indicator is moving. When the pressure stabilizes, the switch will close, sending a signal to an AT timer. The timer cycles and sends a signal to a relay, which sends a signal to the direction control valve of the hydraulic system to stop oil flow.

The above ways, and other ways, may be used to accomplish the purposes of this invention.

DESCRIPTION OF SPECIFIC EMBODIMENTS

Figure 1:
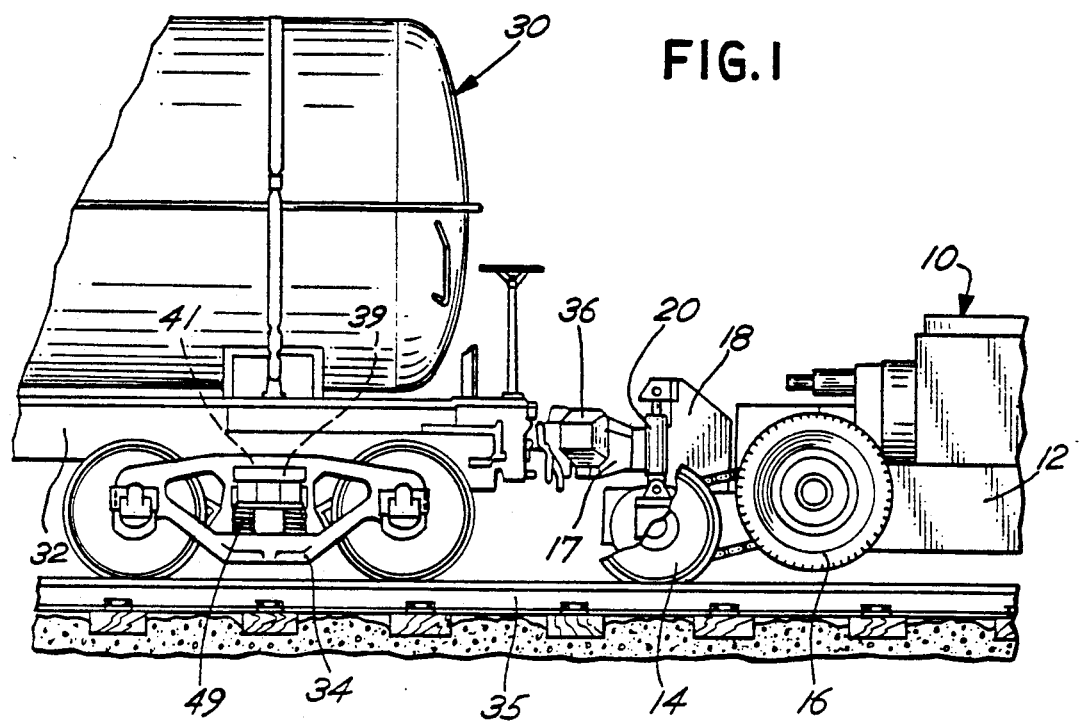
FIG. 1 is a fragmentary, elevational view of a railcar moving vehicle, coupled to a railcar in a position to permit application of weight transfer.
Figure 2:
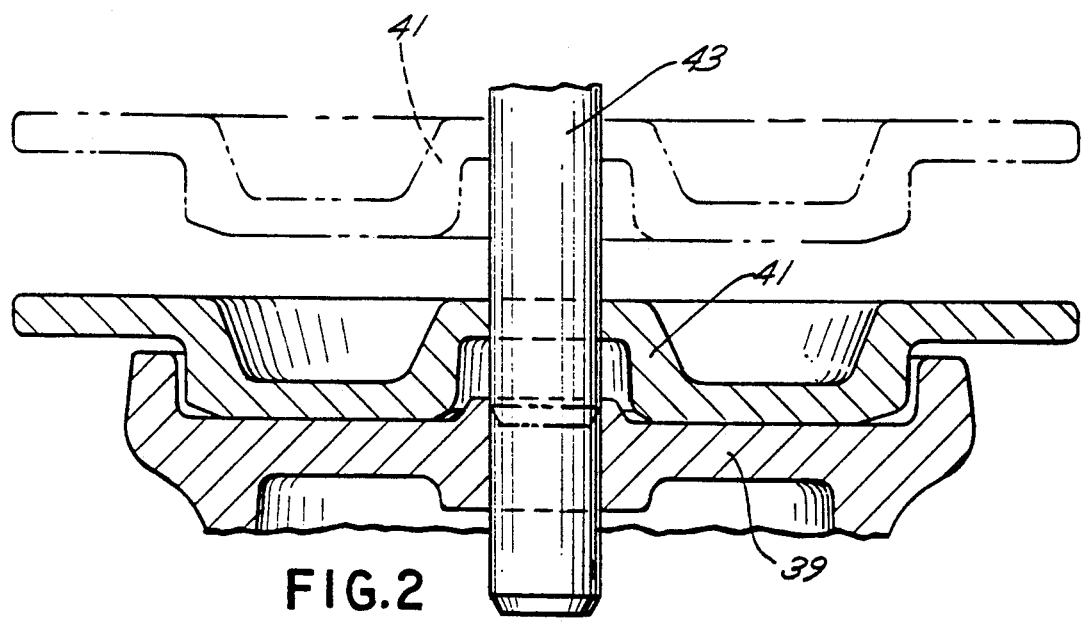
FIG. 2 is a fragmentary, sectional view showing a rail car truck center plate, with the center plate for the railcar carried thereon, being horizontally secured together by a pin, and showing how the weight transfer process can raise the railcar center plate.
Figure 3:
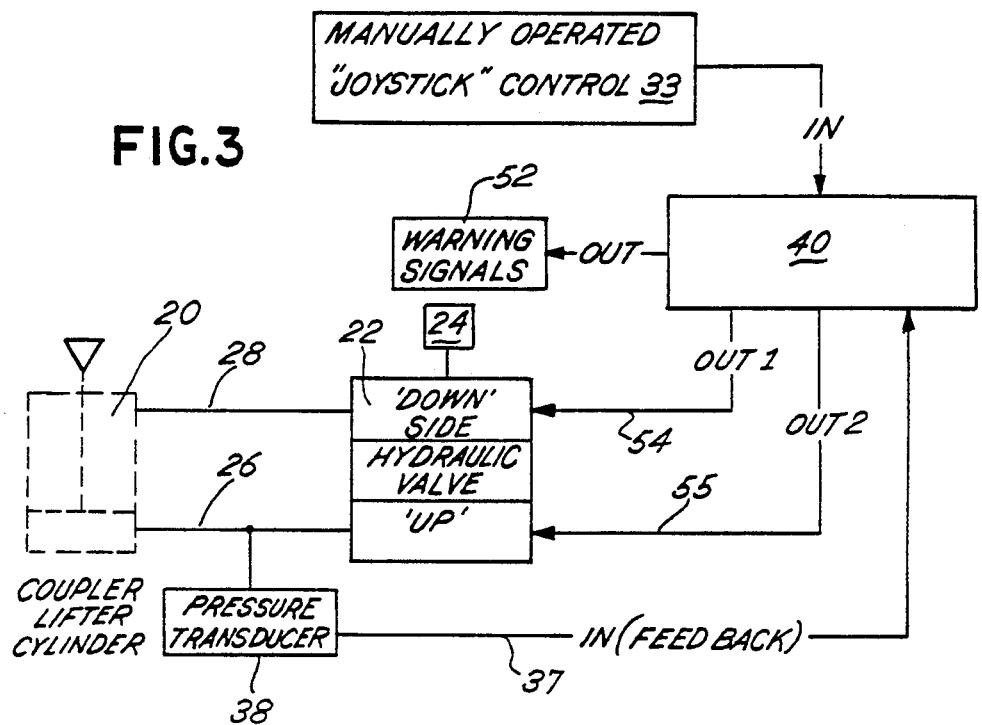
FIG. 3 is a schematic view of one embodiment of the hydraulic weight transfer system in accordance with this invention.

Referring to FIGS. 1 and 2, a railcar moving vehicle 10 is conventionally designed except as otherwise indicated herein, having a frame 12, rail wheels 14, and conventionally retractable road wheels 16, which may be lowered so that the vehicle may operate on the ground.

Vehicle 10 carries a railcar coupler 17, which is carried on a movable frame 18 so that coupler 16 may be moved up and down by a hydraulic system comprising pistons 20, hydraulic valve 22, hydraulic pump 24, hydraulic power line 26 for hydraulic power to pistons 20 to lift coupling 16, and hydraulic relief line 28 to permit coupler 16 to be lowered again. Other conventional parts of the hydraulic system are not shown.

Railcar 30 defines a car body 32 carried on a pair of truck wheels 34, only one of which is shown. Car 30 also defines a coupling 36, which is shown to be linked with coupling 17 of railcar moving vehicle 10.

Generally, vehicle 10 is smaller and lighter than a single railcar 30, not to mention a string of railcars that it may be trying to pull, with the railcars being filled with cargo. In such a circumstance the driving rail wheels 14 may slip on the track 35 so that the railcar moving vehicle is not able to effectively pull a single car or a string of cars. Accordingly, as is conventional, the weight transfer process takes place in which, upon manual signal 33, the hydraulic system described causes cylinders 20 to raise movable frame 18 and coupler 17. This, in turn, causes railcar coupler 36 to rise with coupler 17, lifting the entire railcar body 32 upwardly relative to the truck 34.

As this takes place, pressure transducer 38 senses pressure in hydraulic power line 26, and sends the pressure data through wire 37 to microprocessor based control 40, which may include a comparator unit as described above.

Figure 4:
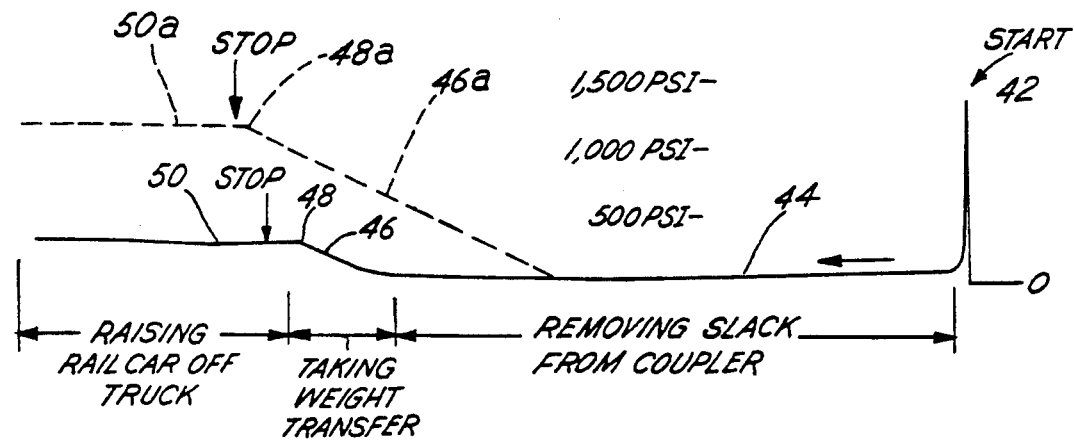
FIG. 4 is a graph with the horizontal axis representing advancement of the piston of the hydraulic means for raising the vehicle coupler, and the vertical axis representing the pressure sensed in the hydraulic power line during such process. The graph extends to the left in the manner of a paper printout from a monitoring device.

A typical pressure change situation that control 40 "sees" is illustrated in FIG. 4, which represents a graph paper track, and extends from the right to the left. The start point is indicated by reference numeral 42, in which the hydraulic system is actuated so that pump 24 pumps oil through valve 22 and power line 26 to advance the piston in cylinder 20, to raise coupler 17.

Initially, in area 44 of the graph track, slack is removed from the coupler so that there is little or no significant increase of pressure in the hydraulic line. Then, at area 46, continued operation of the hydraulic system and raising of coupler 16 results in a gradual, generally straight-line increase in the hydraulic fluid pressure, being representative of the force required to raise railcar 30 as load relief is being gradually applied to springs 49 of truck 34.

At the point 48, where the railcar body 32 begins to move upwardly, separating from truck 34, and all load is off the springs 49, the pressure curve flattens out again, as at reference numeral 50. This flattening is the end point which, when sensed by transducer 38 and control 40, causes a warning signal 52 to be emitted. Preferably, a signal is also sent to hydraulic valve 22 through control lines 54, 55 to close the hydraulic flow circuit so that pistons 20 advance no more. Then, the hydraulic valve is momentarily shifted to 'down' position in order to apply a small amount of preload to springs, 49.

Thus, substantially complete weight transfer may be achieved for any railcar of any weight, without needing to estimate the weight of the railcar, and without even needing to watch the process carefully, since it may be automatically shut off at the proper endpoint.

The solid line curved portion 46, 48, 50 of FIG. 4 represents a situation where a railcar is lightly loaded. The dotted line curve 46a, 48a, 50a illustrates the situation with a more heavily loaded railcar. Curve 46a rises from the flat portion 44 of the tracing as the connected couplers 17, 36 and the railcar are pushed upwardly, relieving pressure on springs 49 of the truck. Then, when the railcar begins to rise out of contact with truck 34 at point 48a, at a higher hydraulic pressure than in the earlier case. Here also the hydraulic pressure flattens out along curve portion 50a, indicating the end point of the process. Then, hydraulic lifting automatically terminates as described above.

FIG. 2 shows a conventional railcar truck center plate 39, plus the railcar center plate 41 which it carries, being horizontally connected together with a conventional pin. Railcar center plate 41 is also shown in dotted line form in a position where couplers 17, 36 have been overlifted by a hydraulic system, so that there is a danger that truck 34 will separate from railroad car 30 during operation. This dotted line situation of FIG. 2 can be avoided in accordance with this invention, even with an unskilled operator and without estimation of the weight of the railroad car from which weight is being transferred.

The above has been offered for illustrative purposes only, and is not intended to limit the scope of the invention of this application, which is as defined in the claims below.

That which is claimed is:

1. In a railcar moving vehicle having a frame, a coupler for coupling said vehicle to a coupler of a railcar, and hydraulic means having a hydraulic power line for raising said vehicle coupler to transfer weight from the railcar to the vehicle, the improvement comprising, in combination:

means for sensing fluid pressure in said hydraulic power line; comparator means for monitoring an increase in said fluid pressure as the hydraulic means raises said vehicle coupler while coupled to a railcar, and for sensing a substantial termination of said increase in fluid pressure as said hydraulic means further raises said vehicle coupler while coupled to said railcar; and indicator means for signalling the occurrence of said substantial termination of the fluid pressure increase.

2. The vehicle of claim 1 in which said signalling of the occurrence is indicated by automatically terminating the raising of said vehicle coupler by the hydraulic means.

3. The method of transferring weight from a first vehicle to a second vehicle through joined couplings of said vehicles, which method comprises:

raising the coupling of said second vehicle to cause raising of the joined coupling of the first vehicle; monitoring an increase in the force required to raise the vehicle couplings as said raising continues; sensing a substantial termination of the increase in said force as further raising of said vehicle couplings takes place; and signalling the occurrence of said substantial termination.

4. The method of claim 3 in which said vehicle coupling is raised by hydraulic means, and said force increase is monitored and said substantial termination is sensed through sensing of hydraulic fluid pressure.

5. The method of claim 4 in which said substantial termination is signalled by automatic termination of said raising.

6. The method of claim 3 in which said substantial termination is signalled by automatic termination of said raising.

* * * * *